(12) United States Patent
Geraldson (10) Patent No.: US 6,332,287 B1
(45) Date of Patent: Dec. 25, 2001

(54) PLANT CULTIVATION APPARATUS AND METHOD

(76) Inventor: Carroll M. Geraldson, 111 99th St., NW., Brandenton, FL (US) 34209

( * ) Notice: Subject to any disclaimer, the term of this patent is extended or adjusted under 35 U.S.C. 154(b) by 0 days.

(21) Appl. No.: 08/812,572

(22) Filed: Mar. 6, 1997

(51) Int. Cl.[7] .................................................. A01G 25/00

(52) U.S. Cl. ........................................................... 47/79

(58) Field of Search ............................... 47/79, 75, 65.5, 47/85, 59

(56) References Cited

U.S. PATENT DOCUMENTS

| | | |
|---|---|---|
| 2,249,197 | 7/1941 | Brundin . |
| 2,463,719 * | 3/1949 | Schakett et al. ........................... 47/79 |
| 2,499,885 * | 3/1950 | Sommer ..................................... 47/79 |
| 2,983,076 | 5/1961 | Merrill . |
| 3,095,670 | 7/1963 | Raab . |
| 3,142,133 | 7/1964 | Brooks . |
| 3,613,309 * | 10/1971 | Coburn ...................................... 47/79 |
| 3,756,681 * | 9/1973 | Croston ................................... 312/351 |
| 3,823,508 | 7/1974 | Takehara . |
| 4,142,324 | 3/1979 | Magyar, Jr. . |
| 4,291,499 | 9/1981 | Prewer . |
| 4,496,725 | 1/1985 | Talbott . |
| 4,745,707 * | 5/1988 | Newby ...................................... 47/79 |
| 5,044,120 | 9/1991 | Couch . |
| 5,103,584 | 4/1992 | Whisenant . |
| 5,117,581 | 6/1992 | Green et al. . |
| 5,193,306 | 3/1993 | Whisenant . |
| 5,315,782 | 5/1994 | Peng . |
| 5,379,547 | 1/1995 | Whisenant . |
| 5,426,889 * | 6/1995 | Buora ....................................... 47/79 |
| 5,471,788 | 12/1995 | Willes . |
| 5,524,387 | 6/1996 | Whisenant . |
| 5,555,675 | 9/1996 | Whisenhant . |

FOREIGN PATENT DOCUMENTS

| | | | |
|---|---|---|---|
| A66991/90 | 5/1991 | (AU) . | |
| 179703 | * 12/1935 | (CH) | ................................... 47/79 N |
| 0130147 | * 1/1985 | (EP) | ..................................... 47/79 I |
| 1423079 | * 11/1965 | (FR) | ........................................ 47/79 |
| 1470367 | * 1/1967 | (FR) | .................................... 47/79 N |
| 255727 | * 11/1927 | (IT) | ..................................... 47/75 N |
| WO86/00494 | 1/1986 | (WO) . | |

OTHER PUBLICATIONS

Geraldson, C.M. 1963. Quantity and balance of nutrients required for best yields and quality of tomatoes. Proc. Fla. State Hort. Soc. 76:153–158.

Geraldson, C.M., A.J. Overman, and J.P. Jones. 1965. Combination of high analysis fertilizers, plastic mulch, and fumigation for tomato production on old agricultural land. Soil Crop. Sci. Soc. Florida Proc. 25:18–24.

Geraldson, C.M. 1967. Evaluation of the nutrient intensity and balance system of soil testing. Soil Crop Sci. Soc. Florida Proc. 27:59–67.

(List continued on next page.)

*Primary Examiner*—Charles T. Jordan
*Assistant Examiner*—Francis T. Palo
(74) *Attorney, Agent, or Firm*—Larson & Taylor PLC (57) ABSTRACT

An apparatus and method for growing plants with controlled rates of nutrient and water input. The apparatus and method includes the use of a reservoir container and a basket-style growing medium container having perforated side and bottom walls spaced inwardly from the walls of the reservoir container. The apparatus is closed by a top wall having openings through which plants can grow with their roots imbedded in a growing medium within the basket-style growing medium container. Water is provided in a reservoir below the bottom wall of the basket-style growing medium container which may have a mechanism for assisting the transfer of water from the reservoir into the growing medium. Pre-selected plant nutrients (e.g., N, K) are appropriately placed in the growing medium at the time of planting and are used over the course of time for plant growth.

19 Claims, 5 Drawing Sheets

OTHER PUBLICATIONS

Geraldson, C.M. 1970. Precision nutrient gradients—A component for optimal production. Soil Sci. and Plant Analysis 1(6):317–331.

Geraldson, C.M. 1973. Nutritional studies using a constant micro source of moisture. Proc. Tropical Region Am. Soc. Hort. Sci. 17:355–362.

Bredahl, M.E., J.S. Hillman, R.A. Rothenberg, N. Gutierrez. 1983. Technical change, protectionism & mkt. structure: The case of internat'l trade in fresh winter vegs. U. of AZ College of Agric. Exp. Sta. Tech. Bull. 249.

Van Sickle, J., D. Cantliffe, E. Belebasis, G. Thompson, and N. Oebker. 1992. Competition with Mexico and potential impacts from free trade. Proc. Florida Tomato Inst., Naples, FL. pp. 2–40.

\* cited by examiner

PLANT CULTIVATION APPARATUS AND METHOD

FIELD OF THE INVENTION

The present invention relates to a cultivation apparatus and method and, more particularly, it relates to a water-efficient and labor-efficient apparatus and method for growing various fruits and vegetables.

BACKGROUND OF THE INVENTION

In the cultivation of various plant species, numerous structures for housing a growing medium have been proposed to enable the grower to control the quantity of water supplied to the roots of the plant as well as to maintain the integrity of the growing medium. In general, these prior art structures have involved a container for the growing medium and other nutrients together with an irrigation system for supplying water.

In U.S. Pat. No. 5,524,387 to Blake Whisenant, entitled "Plant Cultivation Apparatus and Method", incorporated herein by reference, there is disclosed a reservoir container assembly for the cultivation of plants. The reservoir container in the Whisenant patent comprises a single reservoir container which may be made of solid material such as recycled plastic. The reservoir container assembly includes a growing medium volume defined by the reservoir container which is separated from a drain volume along its lower wall by a permeable partition situated in a spaced relationship above the lower wall. In use, the growing medium volume is filled with a growing medium into which plants are grown. The reservoir container assembly of the Whisenant patent has a top wall made of plastic material such as recycled plastic. The top wall has one or more openings therein for plant growth with the plant growth opening being positioned along the side of the top wall adjacent to the lateral wall.

In the apparatus disclosed in the Whisenant patent, there is at least one drain opening in the lower area of one of the lateral walls to allow excess water to flow out of the drain volume and thereby prevent the level of water in the drain volume from rising above the drain opening. This ensures that the top portion of the drain volume will be filled with air and that the growing medium housed above the permeable partition has contact with the air, such air being important for proper plant growth.

The device of the Whisenant patent also utilizes a column or columns of growing medium that extend into the drain volume at the lower portion of the assembly. The column is filled with growing medium to allow the water in the drain volume to reach from the lower portion of the drain volume into the growing medium volume located above the permeable partition. In use, water will move up the growing medium column and into the growing medium volume by the process of capillary action. In addition, in the device disclosed in the Whisenant patent, the column of growing medium is positioned so that it is adjacent to the lateral wall that is near to the plant opening in the top wall. The Whisenant patent discloses that it is preferable that the columns of growing medium be positioned in the corner of the reservoir container but that they can be positioned anywhere under the lateral wall along which the plants are located. In the Whisenant patent, the single reservoir container and its drain volume area is divided into compartments by rectangularly shaped dividers which may be interconnected with one another. The purpose of the dividers is to ensure that the permeable horizontal partition is positioned in the reservoir container so that the permeable partition lies parallel to the bottom wall and at a given height above the bottom wall thereby forming a drain volume for the water.

The device of the Whisenant patent uses a gradient concept for the growing medium and nutrients. The gradient concept was initiated and evaluated during the 1960's as the nutritional component for a field oriented full-bed mulch system of production. The basic components are a soluble source of nitrogen (N) and potassium (K) on the soil bed surface in conjunction with a continuing water table. The N and K move by diffusion to the root and equilibrate concurrently with the less-soluble nutrients in the soil to maintain a predictable range of decreasing ionic concentrations with associated decreases in the ratio of N and K to total ions in the soil solution. The full-bed mulch minimizes the effects of evaporation and rainfall as physical forces that can alter the ionic composition of the soil solution. The total concept is designed to synchronize the rates of nutrient/water input with those of crop removal, and thus provide long term nutritional stability.

Nutrients in the soil move by diffusion, which is synchronized with removal or move by mass flow with the water which is not synchronized with removal. By eliminating in-bed N-K (conventional procedure) and using on-bed N-K (gradient procedure), it is possible to maintain a continuing nutritional stability in the soil solution.

When conventional nutritional procedures are exposed to variations in the soil-plant-season combinations, nutritional stability in the soil solution can be weakened or destroyed. In the transition to more intensive production systems, conventional nutritional procedures often cannot maintain the nutritional stability required for continuing advances in productivity, whereas the gradient procedure sustains that stability.

Tomato yields from experimental field plots using a gradient-oriented procedure averaged 75 to 80 t/ha for 9 successive crop sessions (1964–68) compared to the commercial average of 16 t from an equivalent (unmulched) ha. In the transition to a full-bed mulch system during the 1970's, average commercial yields more than doubled. In shifting to the full-bed mulch procedure, the recommendations required to sustain the gradient were often diluted with conventional procedure, because change in the prevailing procedures not readily accepted and often is fought with great vigor because it compromises the former investment. The full potential of the gradient generally cannot be attained with an alternative procedure that weakens or destroys the integrity of the concept.

In order to further evaluate the potential of the gradient concept, a surface-applied microsource of water in conjunction with a separate surface source of N and K was used to evaluate a lateral oriented gradient. Tomatoes were grown in containers (wooden boxes) that held 0.4 m$^3$ of soil that ranged in type from sandy to organic (peat). The maximum yield was about 8 kg/plant (four plants/box) regardless of the soil type. Mass flow nutrients were minimized, but without a water reservoir the variations in moisture jeopardized the nutritional stability.

SUMMARY OF THE INVENTION

While the reservoir container assembly of the Whisenant patent is beneficial for the growing of large vegetables such as tomatoes, in certain instances it has been found to be advantageous to thermally insulate the growing medium. It has also been found advantageous to modify or control the water evaporation system.

More particularly, one object of the present invention is to provide a reservoir container assembly which thermally insulates and increases the air contact with the growing medium.

A further object of the present invention is to provide an improved method of plant growth by providing controlled access to air, moisture and/or plant nutrients.

BRIEF DESCRIPTION OF THE DRAWINGS

Numerous other objects and advantages of the present invention will become apparent from the consideration of the following disclosure taken in conjunction with the drawings, in which.

DETAILED DESCRIPTION OF THE PREFERRED EMBODIMENT

Figure 1:
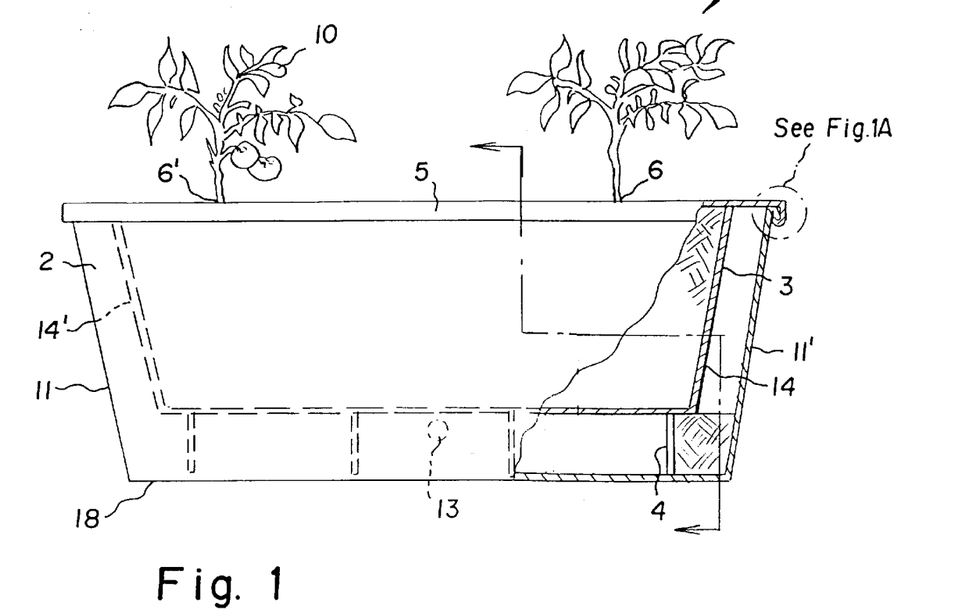
FIG. 1 is a side view of one embodiment of a reservoir container assembly according to the present invention.

As shown in FIG. 1, the reservoir container assembly 1 of the present invention comprises a reservoir container 2, a basket-style growing medium container 3 nested within the reservoir container 2 and resting upon divider 4. The reservoir container is closed by a top wall 5 having opening 6 through which one or more plants can grow with their roots imbedded in the growing medium 7 contained within the basket-type growing medium container.

The reservoir container may be made of a solid material such as recycled plastic. The growing medium volume defined within the baskit-style growing medium container 3 is separated from drain volume 8 by the permeable bottom wall partition 9 of the basket-style container 3. The basket-style container 3 may be made of material such as recycled plastic and have end and side walls 14, 14' and 15, 15'. As an alternative (not shown), the end walls 14, 14' may be eliminated and the side walls 15, 15' extended to the length of the reservoir container 2. The growing medium volume contained within the basket-style container 3 is filled with a growing medium 7 such as soil in which the plants 10 are grown.

The top wall 5 of the reservoir container 2 may be made of solid material such as recycled plastic. The reservoir container 2 has two end walls 11, 11' and two lateral walls 12 and 12'. Top wall 5 has plant opening(s) 6 therein for plant growth, said plant opening(s) being positioned at various places depending upon the type and size of plants being grown as described in more detail below.

As best seen in FIG. 1, the reservoir container has at least one opening 13 in one of the lateral walls 12, 12' to allow excess water to flow out of the drain volume 8 and thereby prevent the level of water within the drain volume 8 from accumulating above the opening 13. This ensures that the top portion of the drain volume 8 will be filled with air and that the growing medium 7 has contact with air along the bottom 9 and end and/or side walls 14,14', 15',15' of the basket-style container. Of course, such air is important for proper plant growth.

Figure 2:
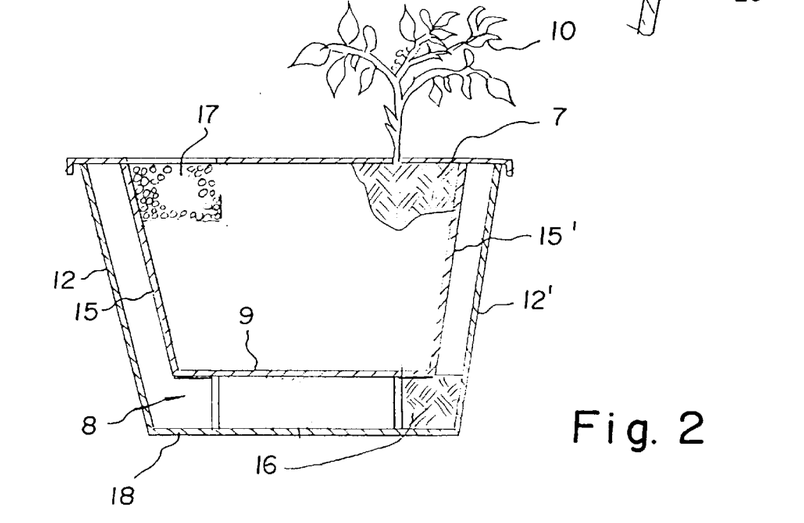
FIG. 2 is a cross-sectional view taken along line 2—2 in FIG. 1 of the reservoir container assembly depicted in FIG. 1.

Growing medium column(s) 16 in drain volume 8 allows the water in said drain volume to reach from the lower portion of said drain volume into the growing medium: 7. Water will move up the growing medium column(s) 16 and into the growing medium 7 by the process of capillary action. As best seen in FIGS. 1 and 2, growing medium column(s) 16 are positioned so that they are adjacent the bottom wall of the basket-style container 3 at locations which :are advantageous for the growing of the particular type of plant as described in more detail below.

FIG. 2 generally shows a band of fertilizer mixture 17 which is placed into the growing medium 7 at the top of the growing medium volume defined by the basket-style container 3. Using the above gradient-oriented nutritional procedures, the fertilizer mixture is placed in an appropriate location depending upon the type of plant being grown, the numbers of plants being grown and the location of the growing medium column(s) with respect to the plant opening in the top wall.

The positioning of plant opening 6, growing medium column 16, and fertilizer mixture 17 at the side of the plant opening causes salt deposits to occur remote the root of the plant 10. The positing of these elements is important because it ensures that the water passing next to the plant 10 has not previosly passed through fertilizer mixture 17. Capillary action causes the water in drain volume 8 to flow up the growing medium(s) 16 and through the growing medium volume to plant openings 6 and 6'. There will thus be flow paths leading from the growing medium column(s) 16, one path to 6 and another path to 6'.

Figure 3:
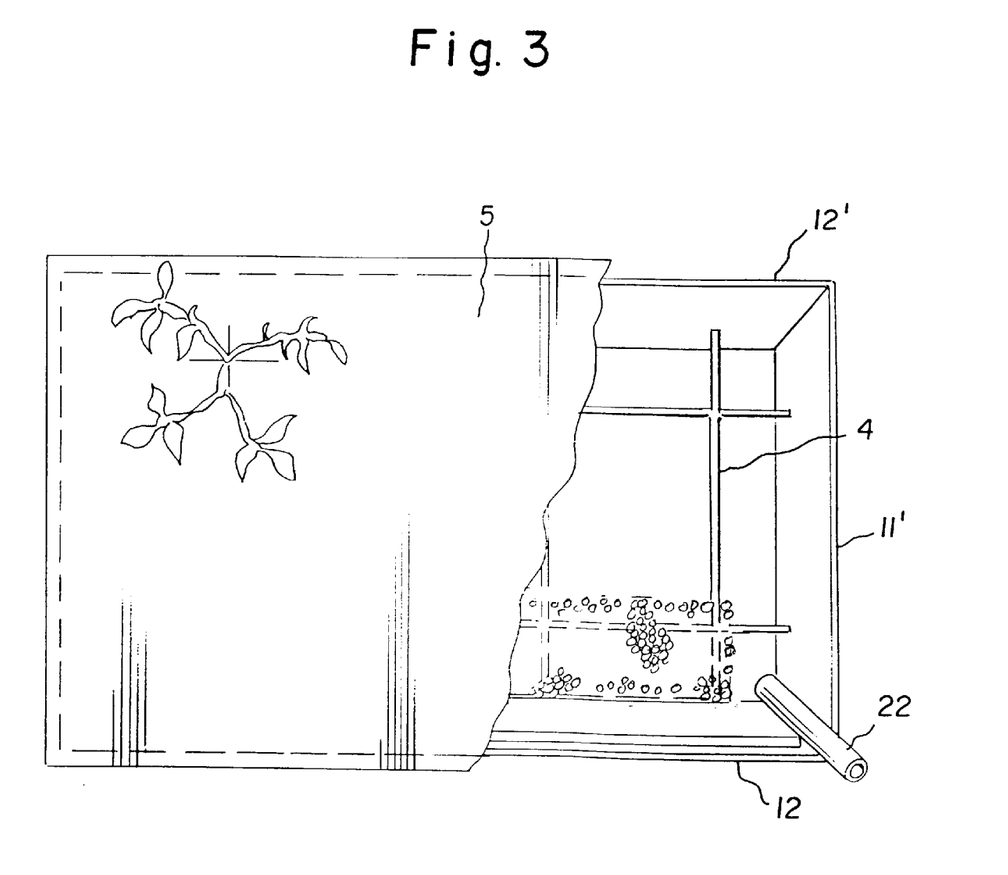
FIG. 3 is a top plan view of a reservoir container assembly of FIG. 1.
Figure 4:
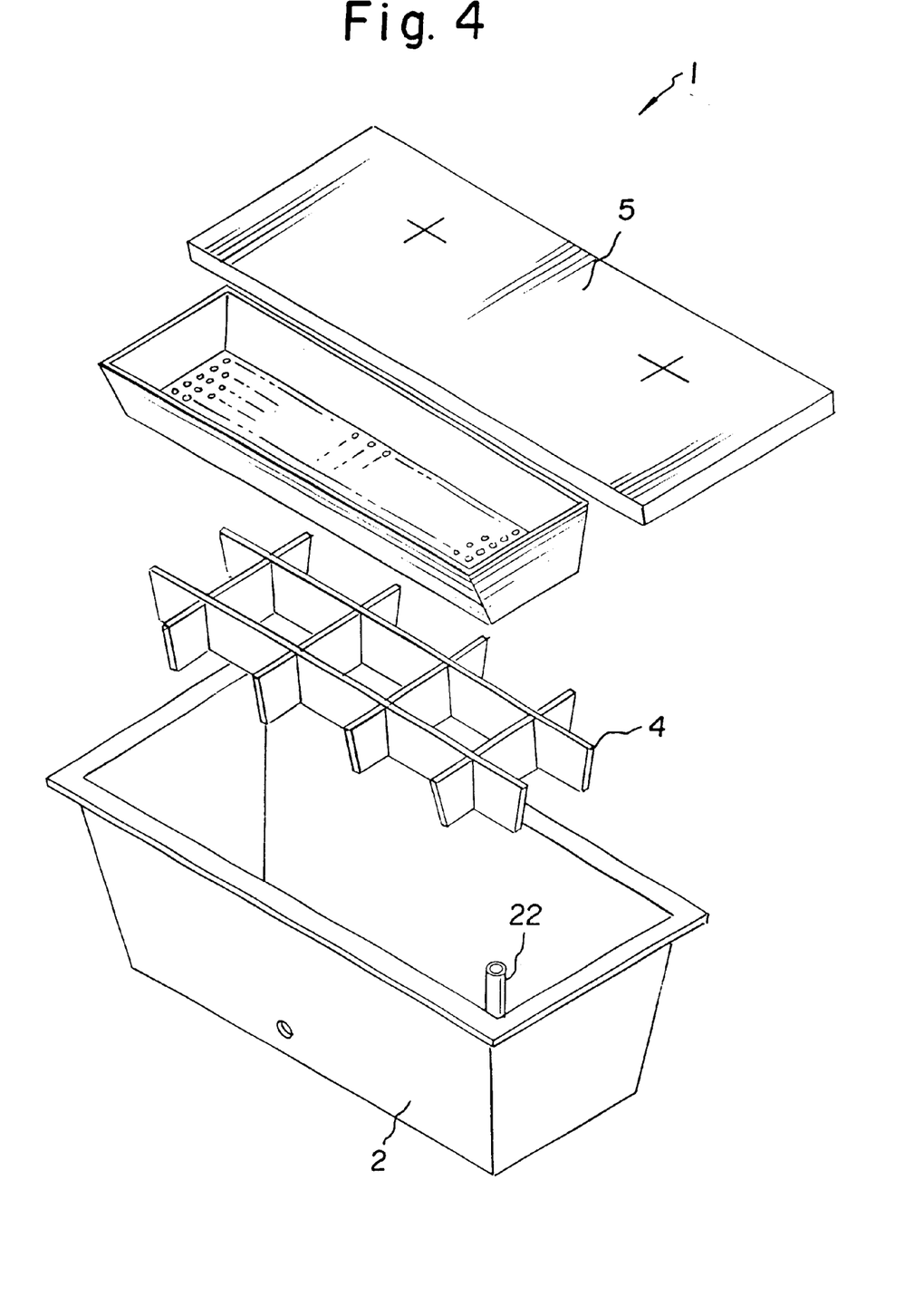
FIG. 4 is an exploded view of the reservoir container assembly FIG. 1 without the growing medium or plants.

As best seen in FIGS. 3 and 4, drain volume 8 is divided into rectangular compartments by dividers 4. These dividers may be rectangularly shaped and may be positioned so as to be approximately perpendicular to the top wall 5 and the bottom wall 18 of the reservoir container. The dividers ensure that the basket-style container 3 and its permeable bottom partition 9, is positioned in the reservoir container 2 so that the permeable partition 9 lies parallel to the bottom wall 18 of the reservoir container and at a given height above the bottom wall 18, thereby forming a drain volume 8.

Figure 5:
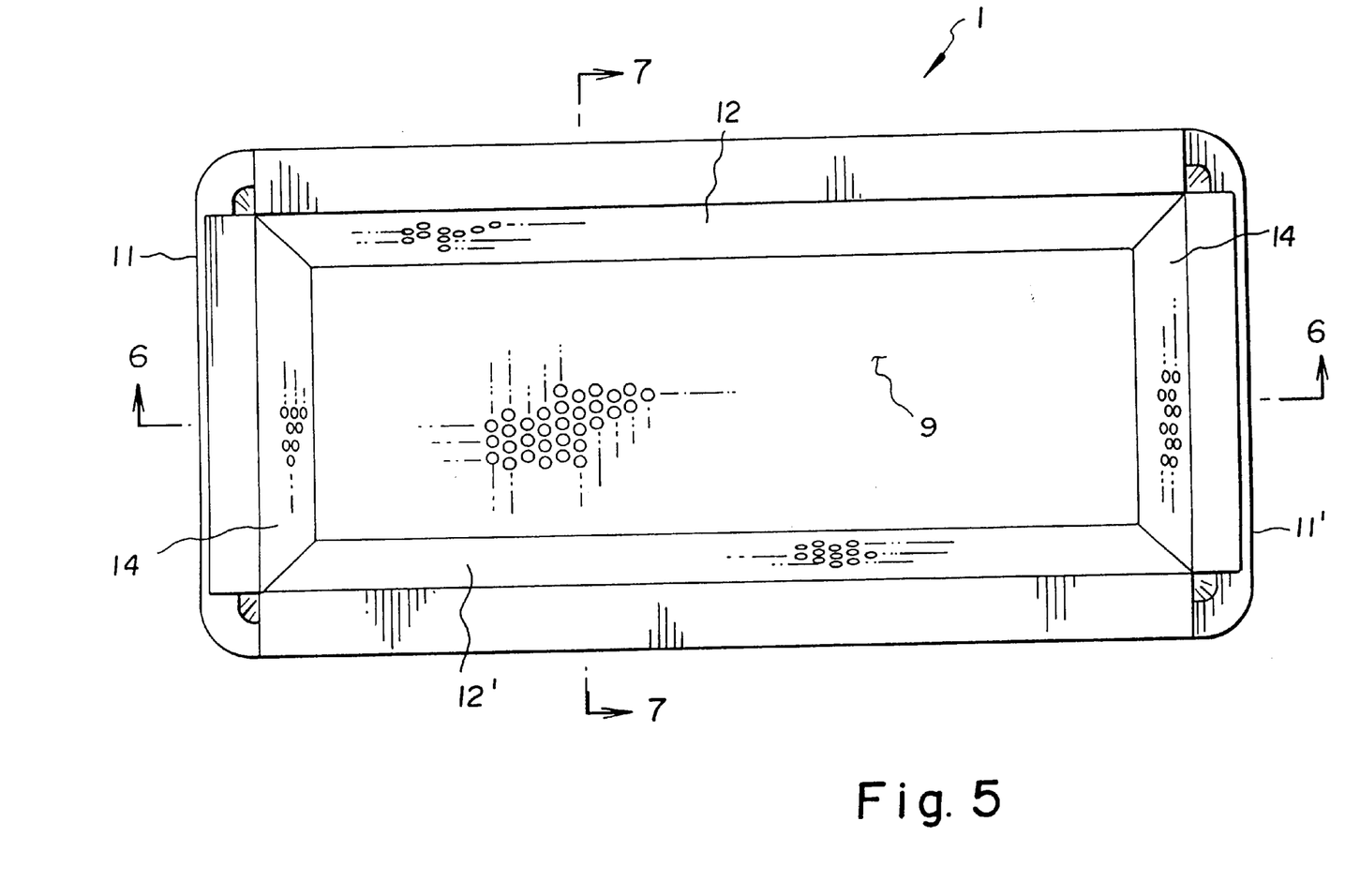
FIG. 5 is a top plan view of the reservoir container sub. assembly according to another embodiment of the present invention.
Figure 6:
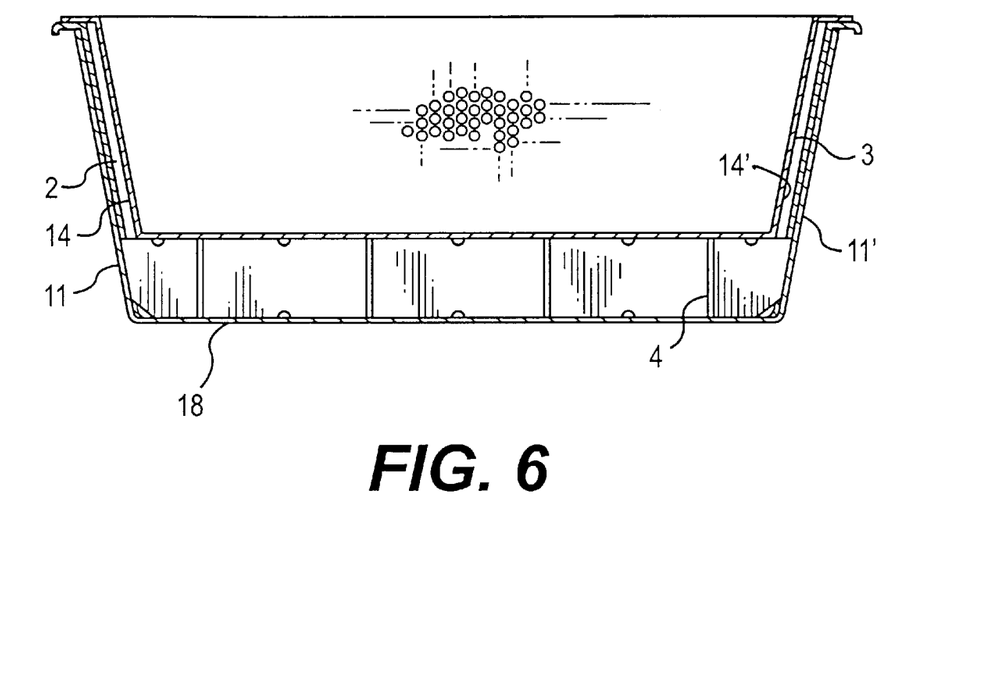
FIG. 6 is a side cross-sectional view taken along line 6—6 of FIG. 5 showing an embodiment of the reservoir container sub-assembly according to the present invention.
Figure 7:
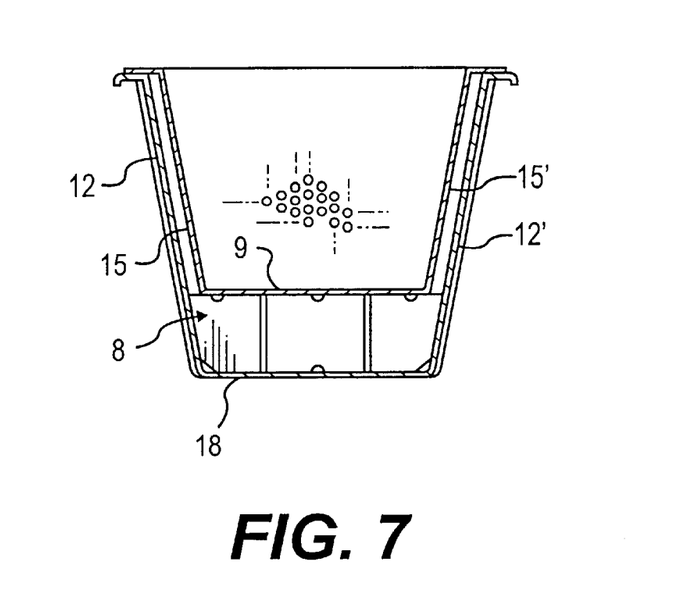
FIG. 7 is an end cross sectional view taken along line 7—7 of FIG. 5 and showing an embodiment of the reservoir container of the present invention.

FIGS. 5, 6 and 7 show that details and inter-relationship of the outer reservoir container 2 and the inner basket-style medium container 3 for containing the growing medium may be different from that of FIGS 1–4. It should be noted that the outer reservoir container 2 presents a horizontal flange surface 19 adjacent its top walls and that the flange has a downwardly extending lip 21 for purposes that will be described further below. As best seen in FIGS. 6 and 7, the basket-style medium container 3 is dimensioned so that its bottom wall 9 rests upon the surface defined by the upper end of the rectangular dividers 4. As seen in FIGS. 5–7, the basket-style growing medium container contains numerous perforations, preferably perforations of about 0.375 inches in diameter on 0.5 inch centers. As should be apparent from FIG. 1 and FIGS. 6 and 7, the outer wall of the basket-style growing medium container 3 is spaced inwardly from the vertical end and side walls 11, 11' and 12, 12' of the outer reservoir container 2. This spacing serves the important functions of creating a thermally insulating air volume around the periphery of the basket-style container 3 and maximizing aeration.

Typically, the basket-style growing medium container 3 may be made of material such as plastic which has the openings preformed in a sheet of material and the basket is then formed by conventional molding process into the form of a basket as shown in the drawings. As an alternative, the end walls 14, 14' of the basket-style medium container may be eliminated and the U-shaped cross section of FIG. 2 carried the whole length of the basket 3.

Figure 1A:
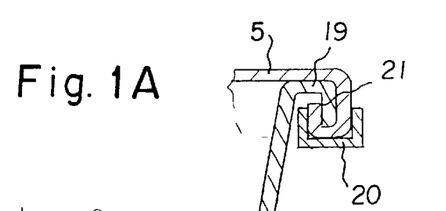
FIG. 1A is an enlarged partial cross sectional view of the connection between the top wall and the reservoir container according to one embodiment of the present invention.

As best seen in FIGS. 1, 1A and 2, the top wall 5 may preferably be made from a plastic mulch sheet or film of dark plastic which has slit(s) to create the opening 6 for the plants 10. Using such material for the top walls enables a simplified construction wherein the edges of the flexible top wall are bent downwardly over the horizontal flange 19 of the reservoir container 2 and held in place by channel-shaped members 20 which engage the peripheral edge of the flexible top wall with the lip 21 that extends downwardly from the top flange 19 of the reservoir container 2.

As best seen in FIGS. 2 and 3, the fertilizer mixture 17 is placed in the growing medium 7 contained within the basket-style growing medium container 3 at locations selected to be appropriate for a given combination of growing medium columns 16 and the type, size and number of plants being grown.

As seen in FIGS. 3 and 4, a fill tube 22 may be provided so that water can be passed into the upper end of tube 22 and fed to the lower portion of drain volume 8.

The following are specific examples of the use and results of the present invention:

EXAMPLE 1

Plant Selection

Some gardeners prefer starting with seedlings or plant starts in their growing container. Healthy looking plants should be selected. A local nursery or County Extension Agency can recommend varieties that are best suited to the user's area. Plants can be grown from seeds in the growing container.

Location and Assembly

The user should choose a location for the growing container which will receive plenty of sunlight. The growing container can also be used indoors if there is enough light. The divider should be in the bottom of the reservoir container with the medium container resting on top of it. Insert the fill tube 22 and use a cable to fasten it through small holes in the upper corner of the reservoir container. The fill tube 22 should be in the front of the reservoir container on the same side as the drain hole 13. The user should be sure that the tube 22 goes from the top of the reservoir container into the water reservoir near the bottom.

Potting Mixture 2.3 cubic feet (about 30 lbs. or 60 dry quarts) of a light and spongy soil-less potting mixture is suitable for potting. Many brands are readily available at any garden center or home store. While the exact composition is not important, most mixes contain about 50% peat moss plus composted wood products, perlite, vermiculite, and minor elements. Many gardeners mix one cup of dolomite to the potting mix. Soil based potting soil is too dense and is not recommended for home use. A good potting mix will last for several growing seasons.

Stakes and Tomato Cages

Tomatoes, eggplant, pole beans and other vine plants will need 4 foot support stakes. They can be installed at the ends of the growing container and secured to the end walls 11, 11' by ties through openings in the walls. Twine can be tied between the stakes to support the plants as they grow. Tomato cages an also be installed after the plants begin to mature. Smaller vegetable and flower plants will not need stakes.

Filling the Growing Container

The user should fill the bottom of the growing container with water until it runs out the drain hole. Openings may have been cut in the permeable bottom of the basket-style container exposing the water and the bottom of the reservoir container. Firmly pack these two openings with moist potting mix. Now cover the permeable bottom with potting mix and fill the basket half way up. Pack the soil down and moisten it well with water. Now completely fill the rest of the basket with potting mix and make a slight crown on top similar to a cupcake. Use plenty of mix so that a lip is not left between the top of the growing container and the top of the potting mix. Add water on top to make sure the potting mix is moist and refill the water reservoir container using the fill tube.

Use of Dry Fertilizer

The growing container differs from conventional gardens in that all the fertilizer is added at one time-right at the beginning. Any general fertilizer such as 6-6-6 or 8-8-8 or organic mixtures can be used. After the growing container has been filled with potting mix, pour two inch wide band lengthwise across the top of the potting mix. The fertilizer should not be mixed in with the potting mix and it should be as far away from the plants as possible. Simply pour the fertilizer band on top of the potting mix and lightly pat it down. The roots of the plants will be needed for that crop.

Time release fertilizer pellets can also be used for herbs, flowers and perennials which have an extended growing time. Use 1 cup of time release pellets, but this should be mixed in with the top 4 inches of potting soil before planting. The top fertilizer band will not be needed if time release fertilizer is used.

Covering and Planting

After the potting mixture and fertilizer has been applied, completely cover the top of the growing container with one of the plastic sheets and secure it over the outside edges of the reservoir container with clips 20 or clothespins (see FIG. 1A). Poke the fill tube through the cover. Place the white side up in warmer climates and the black side up in cooler climates. Cut 4 inch holes or "X's" in the plastic sheet two inches from the outside wall of the growing container, away from the fertilizer band. Plant the seedlings through the "X's" into the potting mix and "water them in" just as in conventional gardening. The plastic mulch sheet remains on the growing container for the life of the plants.

Watering

Plants are watered by simply adding water through the tube 22 to fill the bottom reservoir. You cannot over water with the growing container because of the use of a drain hole 13. The growing container automatically provides the proper amount of moisture—when plants are small one only needs to add water every few days. As the plants grow larger they'll require more water. Add water regularly until it runs out the drain hole indicating the reservoir is full. Rain will not water the plants because they are covered by the plastic sheet as described above.

EXAMPLE 2

A commercial embodiment of the reservoir container of the Whisenant Patent No. 5,524,387 is called the Earth Box®, is made of recycled plastic (manufactured by Polycycle, Inc., Scranton, Pa. 18590), and holds 0.08 $m^3$ of media (soil or potting mix) with a water reservoir that holds 8.4 L and is designed to maintain a nutritional gradient. Earth Box® is a registered trademark of Blake Whisenant. The media is supported on a grid above the water reservoir, with an overflow hole that maintains a minimal 1.25 cm air space between the media and a fluctuating water table. The two rear corners of the grid are cut away allowing the media to extend into the water reservoir. This provides a seepage route for water.

The N-K or N-P-K is banded at the surface and dolomite +micro-nutrients ± phosphorus is mixed in the top 2 to 5 cm of the media. Whether grown in the field or a container, a given yield requires a proportionate quantity of nutrients. The quantity of N, K, Ca, Mg and P required per unit of soil is about 10 times that in the field. The recommended parameters are essential to maintain nutritional stability.

Fertilizer—300 g/plant of an 18-0-25 would provide the N and K and 40 g of 0-20-0, the P for a tomato yield of 9 kg/plant. Dolomite—450 g which is in excess of the required Ca and Mg equilibrates with the more soluble nutrients to provide a range of nutrient concentrations and ratios that favors a maximum productivity.

Transplants for both fall (Aug–Nov) and spring (Feb–May) were used for all crops. Tomatoes were harvested vine ripe primarily during Nov. or May. The total weight/plant (2 plants/container) and the average fruit size from determinate cultivars (Table 1) were used to evaluate the potential of the concept to maintain nutritional stability per unit of time. With the emphasis on diffusion, nutrition as a science can advance beyond the conventional trial and error procedure, providing a predictable gradient-plant oriented stability.

Because of potential water restrictions (e.g., in Florida), microirrigation has become a recommended procedure—one that concurrently has increased costs and requires intensive management to even approach a productivity equivalent to the potential of the gradient in subirrigated systems. Fertigation (N-K in the irrigation water), as a recommended component and a mass flow source, also modifies the gradient concept. In contrast, the containerized gradient procedure has the potential to become a sustainable production system that will benefit society and allow the farmer to competitively (i.e., economically) excel. It is also a technique that is already a benefit to the gardener and individual home owner who uses the Earth Box®.

Containers were designed to provide the recommended parameters for a gradient-oriented nutritional procedure. Even with the limited capacity of the container, the outstanding yield and quality of tomatoes from the containerized gradient system is a reflection of a long-term nutritional stability; 13 to 16 kg/container with 2 plants/container (Table 1), with a quality that reflects the continuing vigor of nutritionally healthy plants. Productivity (fruit set, size and overall quality) of conventional tomato crops diminish as the season progresses, which strongly affects marketability. The concentrated fruit set of determinate tomato cultivars using the nutritional stability of a gradient-oriented procedure has the potential for continued fruit set while, at the same time, maintaining size and quality as the season progresses.

Conventionally containerized production using soil, potting mix or rock wool in pots or bags with nutritionally stable, hydroponically oriented formulations require intensive management (periodic adjustment along with leaching or replacing the soil or hydroponic solution to maintain or restore nutritional stability). The cost, required management and vulnerability of this procedure has limited its potential.

With the gradient procedure all of the nutrients for one or more crops are placed in the container initially. Water required is only that used for transpiration, there is no leaching, the management is reduced to simple maintenance of a water table plus necessary pest-control procedures. Many vegetable crops, strawberries and flowers have been grown the Earth Box® Climate-wise, rainfall is not a problem; with the enclosed system, leaching and evaporation are eliminated as contributing variables. According to the present invention, increased productivity has been found with a maximum tomato yield of 11.3 kg/plant (see Table 1).

With the gradient concept as the dominant source of nutrients, nutritional research approaches that of an exact science, because the gradient composition is maintained by the chemical processes of diffusion and equilibration—providing long-term nutritional stability regardless of the soil-plant-season and whether the crop is grown in the field or a container.

While the Earth Box® is primarily sized for the home gardener, commercial versions of larger size and different shape may be used for a containerized field operation without departing from the gradient concept and the present invention.

TABLE 1

Tomato production using containerized gradient procedure (Earth Box ® for 3 crop seasons (kg/plant, g/fruit).*

| | Season | | | | | |
|---|---|---|---|---|---|---|
| | 1990 | | 1991 | | 1992 | |
| Cultivar | kg/plant | g/fruit | kg/plant | g/fruit | kg/plant | g/fruit |
| 8HN-22 | 6.1 | 207 | 7.0 | 238 | 7.5 | 221 |
| Sunny | 6.9 | 167 | 6.8 | 189 | 8.6 | 172 |
| Solar Set | 6.7 | 176 | — | — | — | — |

*Average of 3 reps (2 plants/container).

Note: In comparison, maximum yields of 11.3 kg/plant have been recorded using a double walled container which includes a perforated inner wall of the present invention.

It will be apparent to those skilled in this art that various modifications may be made thereto without departing from the spirit and scope of the invention as defined in the following claims.

What I claim as my invention is:

1. A reservoir container assembly for growing plants comprising:
   a first container for holding a liquid,
   second container means including a perforated basket for holding a plant growing medium, said second container means being horizontally adjustably located in said first container so that an air space is provided between said second container means and said first container, means for assisting the transfer of water from said first container to said medium, wherein said first container has a top wall portion that, in use, faces substantially upwardly and covers both said first container and said second container means, said top wall portion including an opening for allowing plant growth therethrough.

2. A reservoir container assembly for growing plants with a small amount of water, comprising:

a reservoir container comprising a bottom, side walls and end walls and an open top, the open top being disposed upwardly when the reservoir container is in use;

a discrete divider structure located adjacent the bottom of said reservoir container and having an upper surface spaced a distance from the surface of the bottom;

a discrete basket-style container having side walls and an open top, the open top of said basket-style container being disposed upwardly when the reservoir is in use, the basket-style container having its bottom wall disposed upon said divider structure, said basket-style container holding a plant growing medium, the bottom and side walls of said basket-style container having perforations so that moisture from a drain volume defined by said divider structure and reservoir container, can pass into the plant growing medium; and a top wall on said open top of said reservoir container which also covers said open top of said basket-style container with at least one plant opening therein for allowing plant growth therethrough.

3. The invention of claim 2 wherein said basket-style container is horizontally adjustably nested within said reservoir container so that the walls of said basket-style container are spaced inwardly from the walls of the reservoir container.

4. The invention of claim 2 comprising an opening in a wall of the reservoir container located at a vertical distance from the bottom wall of said reservoir container sufficient to allow water contained in the drain volume defined in the bottom of the reservoir container to keep the water level at a predetermined level which is below the level of the bottom wall of the basket-style container.

5. The invention of claim 2 wherein said basket-style container has perforated side, bottom and end walls.

6. The invention of claim 5 wherein said perforations are about 0.375 inches in diameter and on 0.5 inch centers.

7. The invention of claim 2 wherein said bottom wall of said basket-style container includes means for assisting transfer of water from said reservoir container to said plant growing medium.

8. The invention of claim 2 wherein said plant growing medium has a band of fertilizer near its top surface, said band being spaced from said plants.

9. The invention of claim 2 wherein said plant growing medium includes time release fertilizer pellets.

10. The invention of claim 2 wherein said basket style container has a U-shaped cross section formed by bottom and side walls extending the entire length between the end walls of said reservoir container.

11. A reservoir container assembly for growing plants comprising:

a first container for holding water, second container means including a perforated wall for holding a plant growing medium, said second container means being horizontally adjustably located in said first container so that an air space is provided by positioning said perforated wall in a spaced relationship from a side wall of said first container, means for assisting the transfer of water from said first container to said medium, wherein said first container has a top wall portion that, in use, faces substantially upwardly and covers both said first container and said second container means, said top wall portion having an opening for allowing plant growth therethrough.

12. A reservoir container assembly for growing plants comprising:

a reservoir container comprising a bottom, side walls and end walls and an open top, the open top being disposed upwardly when the reservoir container is in use;

a discrete means located adjacent the bottom of said reservoir container and defining an upper surface spaced a distance from the surface of the bottom;

a discrete second container having side walls and an open top, the open top of said second container being disposed upwardly when the reservoir is in use, the second container having its bottom wall disposed on said support means, said second container holding a plant growing medium, the bottom and side walls of said basket-style container having perforations so that moisture and air from the drain volume defined by said support means and reservoir container can pass into the plant growing medium; and a top wall on said open top of said reservoir container which also covers said open top of said second container with at least one plant opening therein for allowing plant growth therethrough.

13. The invention of claim 12 wherein said second container is nested horizontally adjustably within said reservoir container so that a wall of said second container is spaced inwardly from a wall of the reservoir container.

14. The invention of claim 12 comprising an opening in a wall of the reservoir container located at a vertical distance from the bottom wall of said reservoir container sufficient to allow water contained in the drain volume defined in the bottom of the reservoir container to keep the water level at a predetermined level which is below the level of the bottom wall of said second container.

15. A method of growing plants from seeds or seedlings comprising:

providing a reservoir container comprising a bottom, side walls, end walls and an open top disposed upwardly, placing a discrete basket-style container within said reservoir container, said basket-style container having an open top and perforated side and bottom walls and means for assisting the transfer of water from said reservoir container to the interior of said basket-style container, said placing step including the adjusting of said reservoir container and said basket-style container so that the walls and bottom of the basket style container are spaced inwardly from the respective walls and bottom of said reservoir container, filling the interior of said basket-style container and said means for assisting transfer of water with a plant growing medium, providing a source of fertilizer adjacent to the top surface of said growing medium at a location remote from the location for the seeds or seedlings, covering the top of the reservoir container and basket-style container with a plastic sheet, cutting holes in said plastic sheet in the locations for the seeds or seedlings, planting the seeds or seedlings through said holes into the growing medium, adding water to at least part of the space formed between the bottom of the reservoir container and the inwardly spaced bottom of said basket-style container, said watering step being repeated a number of times during the growing of said seeds or seedlings.

16. The invention of claim 15 wherein said fertilizer is a band of dry granular fertilizer on the top surface of said growing medium at a location remote from the location of the seeds or seedlings.

17. The invention of claim 15 wherein said fertilizer is in the form of time release pellets mixed in with at least part of said growing medium.

18. A method of growing plants from seeds or seedlings comprising:

providing a reservoir container, placing a discrete basket-style container within said reservoir container, said basket-style container having an open top and at least one perforated side and bottom walls, said placing step including the adjusting of said reservoir container and said basket-style container so that the walls and bottom of the basket-style container are spaced inwardly from the reservoir container, filling the interior of said basket-style container with a plant growing medium, providing a fertilizer in said growing medium, covering the reservoir container and basket-style container with cover sheet, cutting holes in said sheet at the locations for the seeds or seedlings, planting the seeds or seedlings through said holes into the growing medium, adding water to at least part of the space formed between the reservoir container and the inwardly spaced bottom of said basket-style container, said watering step being repeated a number of times during the growing of said seeds or seedlings.

19. The invention of claim 18 wherein water is evaporated into the air space formed between the side walls of the basket style container and the reservoir container.

* * * * *